July 24, 1928.

G. H. HINES

POWER CONTROL DEVICE

Filed Nov. 29, 1927

1,678,595

7 Sheets-Sheet 1

Gail H. Hines
INVENTOR

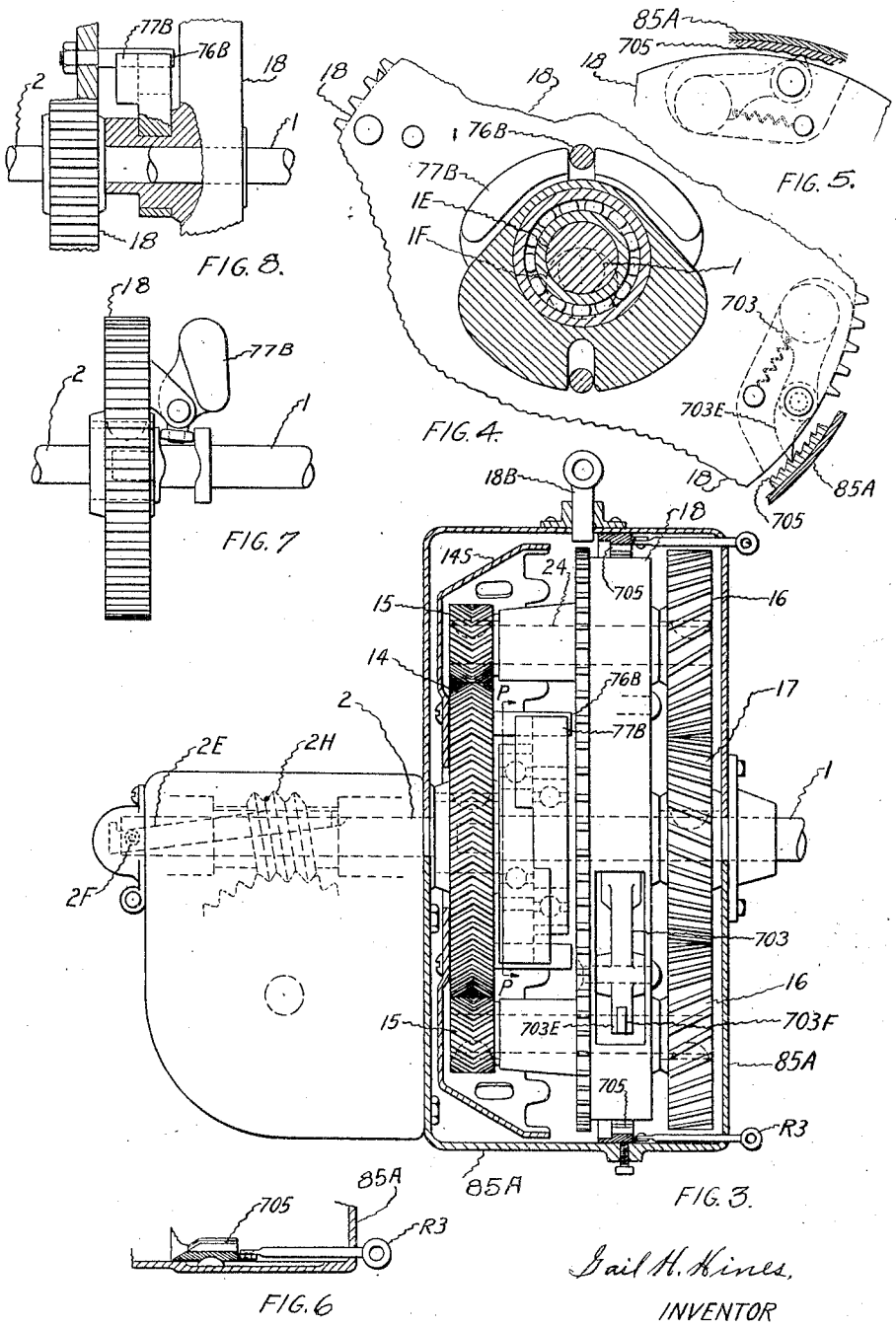

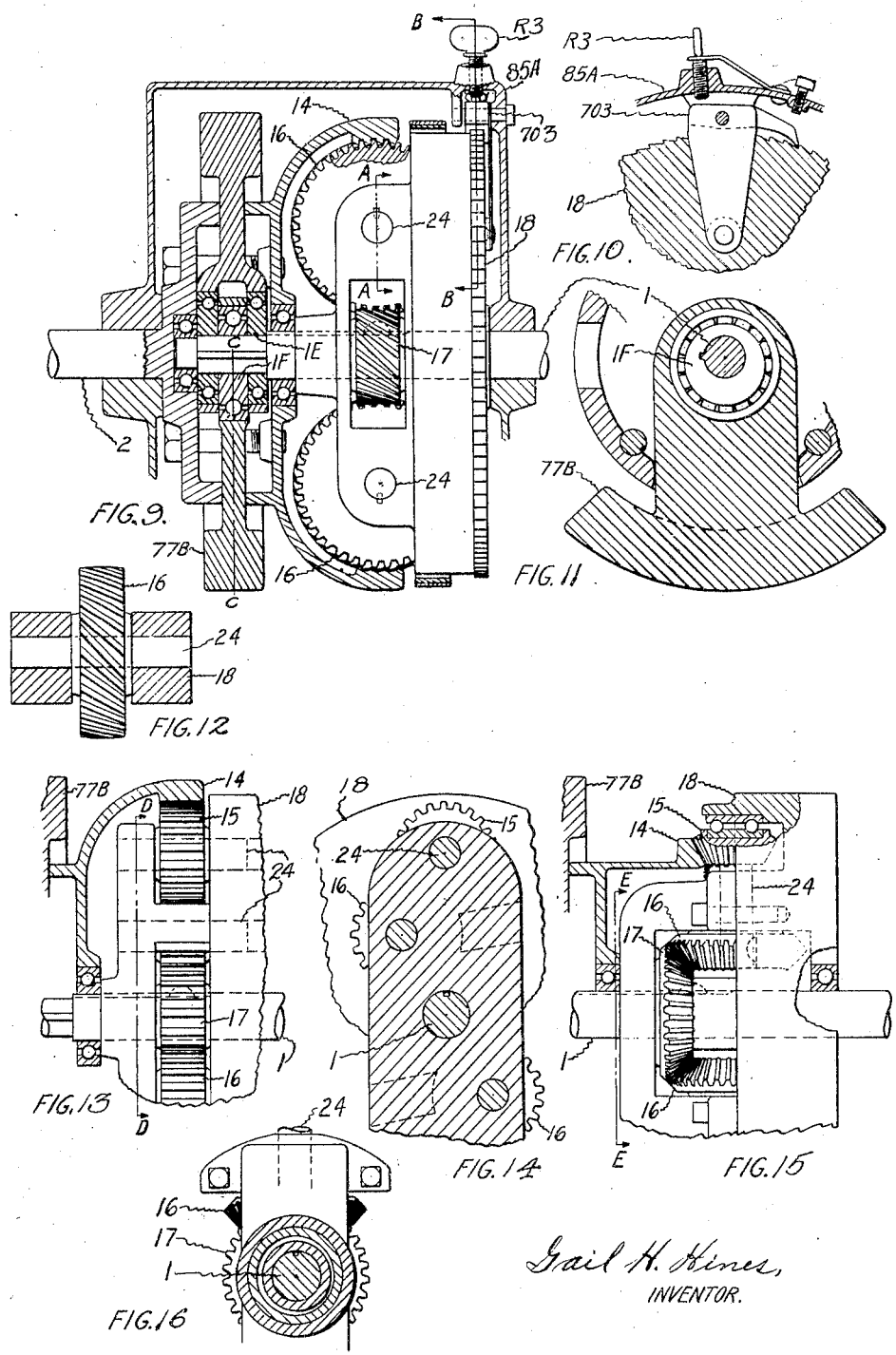

July 24, 1928.
G. H. HINES
1,678,595
POWER CONTROL DEVICE
Filed Nov. 29, 1927
7 Sheets-Sheet 4
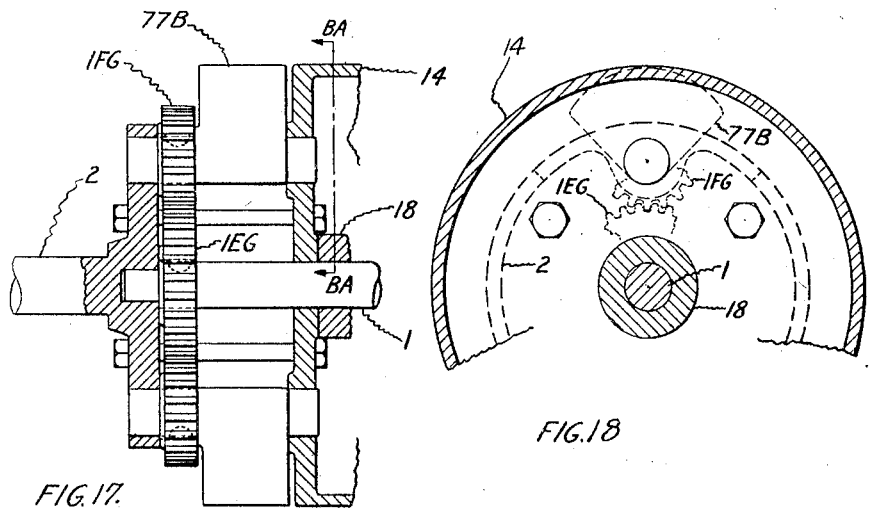
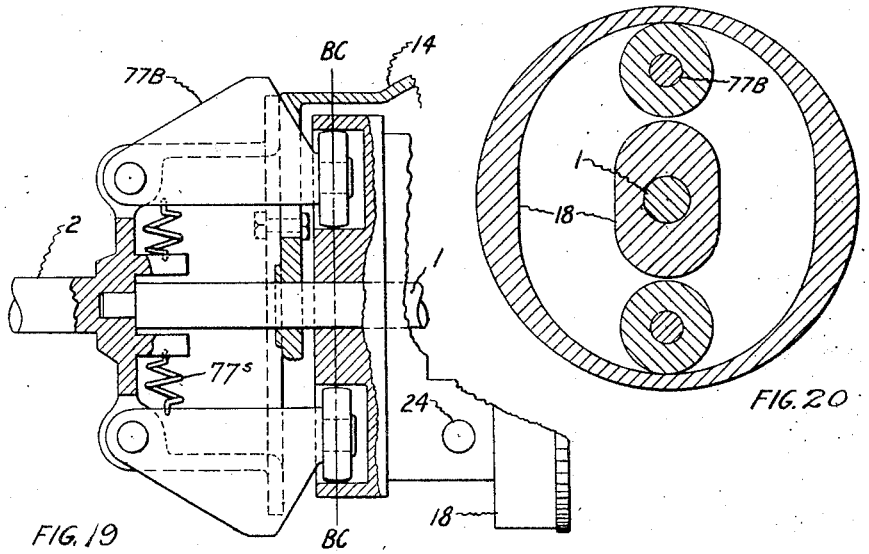
Gail H. Hines
INVENTOR July 24, 1928.

G. H. HINES 1,678,595

POWER CONTROL DEVICE

Filed Nov. 29, 1927

7 Sheets-Sheet 5

Gail H. Hines,
INVENTOR.

July 24, 1928.  1,678,595

G. H. HINES

POWER CONTROL DEVICE

Filed Nov. 29, 1927    7 Sheets-Sheet 6

*Gail H. Hines,*
INVENTOR.

July 24, 1928.

G. H. HINES 1,678,595

POWER CONTROL DEVICE

Filed Nov. 29, 1927        7 Sheets-Sheet 7

Gail H. Hines,
INVENTOR

Patented July 24, 1928.

1,678,595

UNITED STATES PATENT OFFICE.

GAIL H. HINES, OF LANSING, MICHIGAN.

POWER-CONTROL DEVICE.

Application filed November 29, 1927. Serial No. 236,571.

The principal object of the invention is to provide a simple power-control device whereby to vary automatically the ratio of speed transmission in two aligned shafts.

Another object of the invention is to provide a power-control device employed as a flywheel, preferably a motor-flywheel, to be operatively used in connection with a friction or centrifugal clutch installed between the device and the load.

A further object of the invention is to include means whereby to quickly disconnect or render inoperative certain elements of the device to allow easy towing of an automobile.

And still another object is to employ essential elements of the device as a centrifugal clutch to gradually connect the driving power to the load-carrying elements.

In general it is my aim to set forth these and certain other improvements and refinements which I have invented to elaborate upon the particular power-control device set forth in my application for Letters Patent filed Feb. 2, 1927, and having Serial No. 165,407, to which I refer you for more complete information regarding the basic idea upon which is made the improvements herein set forth.

Furthermore this specification in general is intended to contain substantially the same basic use of principles as set forth in my application for Letters Patent on power-control devices filed Sept. 10, 1927, and having Serial No. 218,831, and because of the more complete disclosure herein this application is taking the place of the aforesaid application filed Sept. 10, 1927.

The annexed drawings and the following description set forth in detail certain mechanisms embodying the invention, such disclosed means constituting, however, but few of the various mechanical forms in which the principle of the invention may be used.

Figure 2:
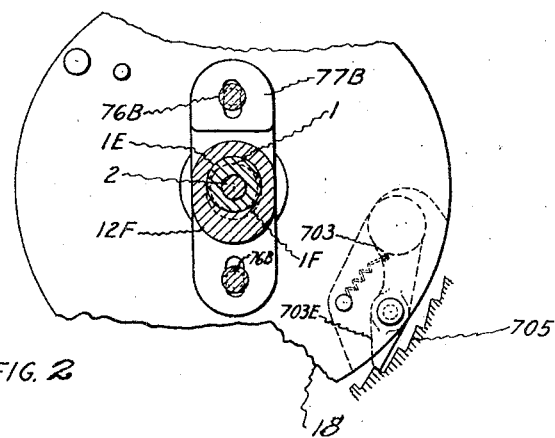
Figure 1:
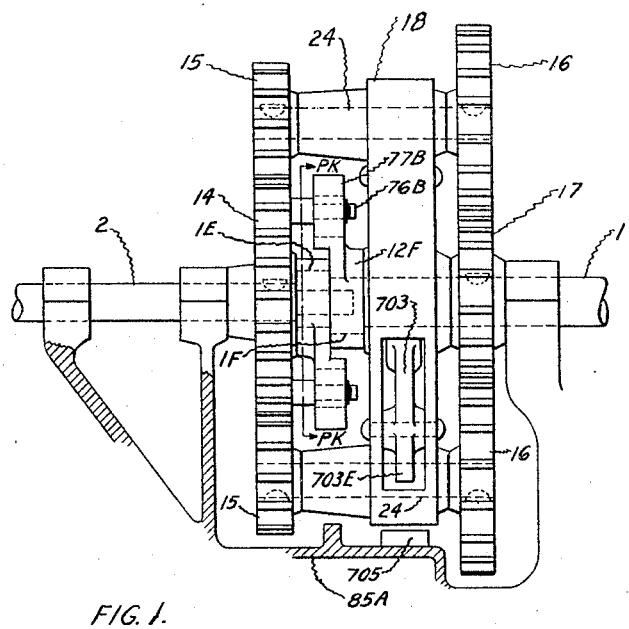
Figure 21:
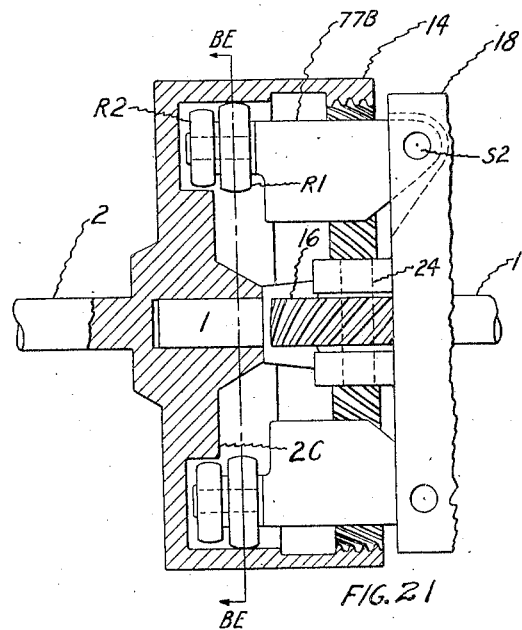
Figure 22:
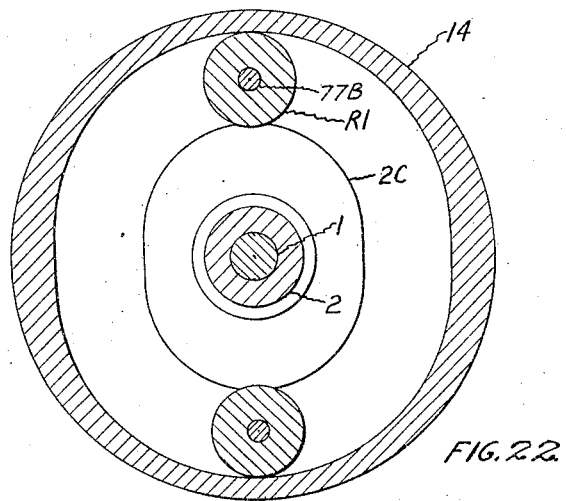
Figure 23:
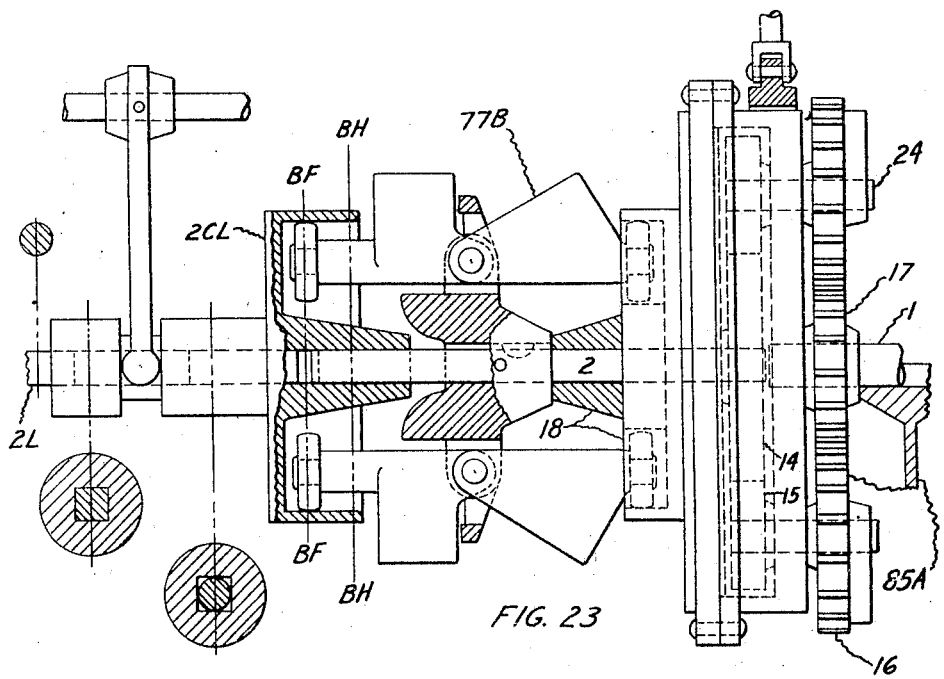
Figures 24, 25:
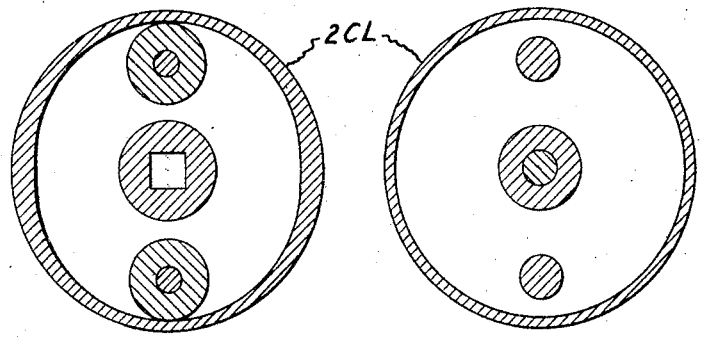
Figure 26:
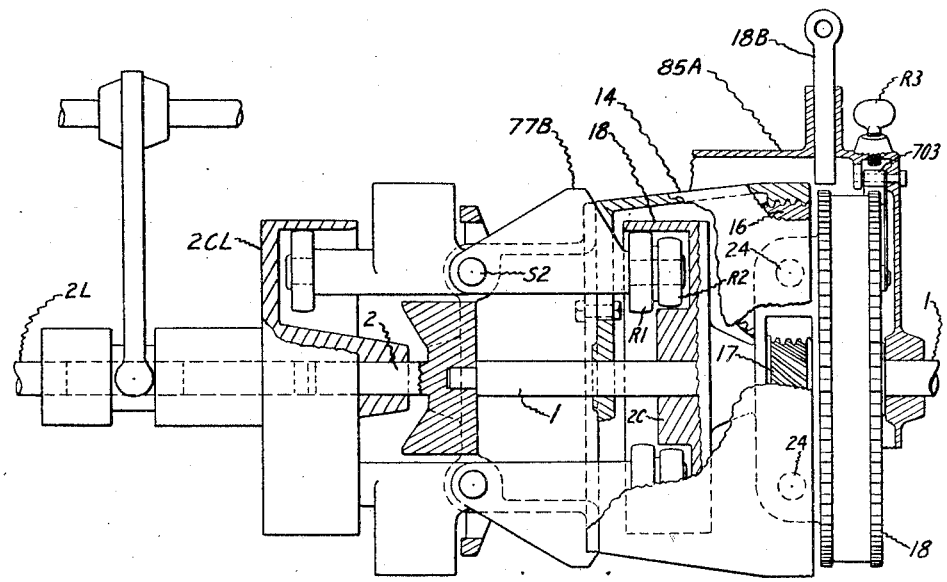

In said annexed drawings:—Figure 1 is a side elevational view, in part a side elevation and in part a vertical section, showing one simple embodiment of my improved device. Fig. 2 is a sectional view taken on line PK—PK of Fig. 1. Fig. 3 is a view similar to Fig. 1 showing a more elaborate embodiment including means to combine my improvements with a worm-drive axle and suggesting the use of silent type gears. Fig. 4 is a sectional view taken on line P—P of Fig. 3. Fig. 5 is an auxiliary view showing an equivalent form of pawl arrangement in lieu of the form and arrangement of parts 703 and 705 shown in Fig. 4 of the drawings. Fig. 6 is a sectional view showing an equivalent form of toothed, annular ring employed to be moved into and out of engagement with the coacting pawl-levers in lieu of the fixed toothed ring shown under symbol 705 in Fig. 3, and is manipulated to be moved forward and backward by means of rods R3 projecting thru the case as shown, and is employed in lieu of the removable key 2E shown locking the worm shaft to the worm thereon in Fig. 3. Fig. 7 is an auxiliary view showing an equivalent form and arrangement of means to move centrifugal weights as employed in my device. Fig. 8 is an auxiliary view of equivalent construction showing centrifugal weights moved by eccentrics integral with the drum 18 employed to vary rotation of the drum. Fig. 9 is a side view, in part a side elevation and in part a vertical section showing a modified form of my device wherein I employ a spiral planet-gear in mesh with the driving and driven gear and an automatically actuating pawl carried in the case or housing of my device and suggesting an arrangement whereby the centrifugal weights are oscillated against centrifugal resistance as well as reciprocated against centrifugal resistance. Fig. 10 is a sectional view taken on line B—B of Fig. 9. Fig. 11 is a sectional view taken on line C—C of Fig. 9. Fig. 12 is a sectional view taken on line A—A of Fig. 9. Fig. 13 is a fragmentary side view, in part a side elevation and in part a vertical section showing a modified form and arrangement of constructing a planetary differential gear-assembly as employed in my device wherein I use an internal gear 14. Fig. 14 is a sectional view taken on line D—D of Fig. 13. Fig. 15 is a view similar to Fig. 13 wherein I employ bevel gears. Fig. 16 is a sectional view taken on line E—E of Fig. 15. Fig. 17 is a fragmentary side view, in part a side elevation and in part a vertical section showing a modified form and arrangement of elements wherein I employ gears in lieu of cams to move centrifugal weights against centrifugal resistance as employed in my device. Fig. 18 is a sectional view taken on line BA—BA of Fig. 17. Fig. 19 is a view similar to Fig. 17 in which I show a duplex elliptical cam employed to move weights against centrifugal resistance, said cam having fixed connection with the drum or carrier of the planet-gear. Fig. 20 is a section taken on line BC—BC of Fig. 19. Fig. 21 is a top view, in part a plan view and in part a horizontal section showing how to employ centrifugal weights in positive connection with the carrier of the planet-gear to be moved against centrifugal resistance by means of a cam fixed to the driven shaft or load-carrying element. Fig. 22 is a sectional view taken on line BE—BE of Fig. 21. Fig. 23 is a side view, in part a vertical section and in part a side elevation showing how obvious it is that the planet-gear carrier may be mounted on either the driving or driven shaft, or on both said shafts 1 and 2, especially illustrating the unbalanced planet-gears 16, and in particular showing forms and arrangements of elements whereby a centrifugal clutch is provided to gradually pick up and carry the load including illustration of a second load shaft 2L carrying a radially movable, variably elliptical cam 2CL. Fig. 24 is a section taken on line BF—BF of Fig. 23. Fig. 25 is a section taken on line BH—BH of Fig. 23. Fig. 26 is a side view, in part a vertical section and in part a side elevation showing a complete assembly of my invention of which more detailed views of the several mechanisms are illustrated in the foregoing figures, and especially in Figs. 9, 10, 19, 21 and 23, and showing the embodiment to which my claims especially refer.

Inasmuch as certain mechanisms in my device are, generally, made up of two like parts arranged symmetrically in pairs I may hereinafter indicate like parts, thusly arranged, as being plural but designated by the same single symbol.

Referring to the drawings, shafts 1 and 2 are journaled in alignment for relative rotation, one to the other, in the case 85A. The gear 17 is fixed to the shaft 1 and the gear 14 is fixed to the load-carrying or driven shaft 2. Adjacent to and rearward of the gear 17 the drum or planet-gear carrier 18 is loosely mounted on the driving shaft 1, preferably; however, the drum 18 may be carried thusly by the driven shaft 2, or it may be carried on both the driving and driven shafts which have relative rotation with respect to the drum 18. In the drum 18 are journaled the countershafts 24 and disposed to revolve about the axis of the aligned shafts 1 and 2. Fixed on the forward ends of the shafts 24 are the planet-gears 16, referring to the construction illustrated in Figs. 1 and 3 of the drawings; however, when employing spiral planet-gears as illustrated in Fig. 9 the axis of each gear 16 will be disposed transversely with respect to the axis of the driving shaft 1 and the special arrangement shown in Fig. 9 will be hereinafter more specifically referred to and as an example for illustration I may select the construction shown in Fig. 3 of the drawings, in which the gears 16 are in mesh with the driving gear 17. Fixed on the rear ends of the shafts 24 are the gears 15 which are in mesh with the driven gear 14. In suitable recesses formed receding inward from the peripheral surface of the drum 18 are swingingly carried the pawl-levers 703 disposed so that the short ends 703E will be formed to extend beyond the periphery of the drum 18 when caused to function thusly perforce of suitable springs acting between the drum and the pawl-levers. The long ends of the pawl-levers carry suitable weights disposed to be acted upon by centrifugal force to draw the short ends 703E of said pawl-levers within the periphery of the drum 18. A series of teeth 705 disposed arranged in annular form about the inside of the case 85A is adapted to be engaged by the pawl-levers 703 when the short ends 703E of said pawl-levers are projected beyond the periphery of the drum 18. Disposed between the drum 18 and the gear 14 are located the diametrically opposed eccentrics 1E and 1F formed integral with or fixed to the driving shaft 1. Centrifugal weights 77B are loosely mounted upon the eccentrics 1E and 1F and may be carried upon plain bearings as shown in Fig. 1 or upon ball bearings as shown in Fig. 3. Guide studs 76B are fixed to the gear 14 projecting therefrom transversely forward thru suitable guide slots formed in the weights 77B so that said weights may reciprocate radially but must revolve about the axis of the driven shaft 2 at the same speed as the gear 14 rotates. The shaft 2 may be employed as the worm-shaft in a worm driven axle of an automobile. A key 2E having a rectangular cross section may engage the keyway of the worm 2H and project rearwardly and diagonally thru a suitably disposed slot in the shaft 2 formed fittingly to receive the key 2E. When in operative position the key 2E is held thusly by means of a pin 2F passing thru both the key and the shaft 2. A portion of the key 2E is projected rearwardly beyond the rear extremity of the shaft 2 and suitably formed to be easily and quickly extracted by means of some tool ordinarily carried in the kit.

An oil slinger 14S may be secured in any ordinary manner to the gear 14 to be rotated therewith, and troughs as are commonly used may be secured to the sides of the case 85A to adequately distribute oil to the working parts.

A series of notches may be annularly formed on the drum 18 and disposed to be engaged by a manually operated bolt 18B reciprocatively carried projecting thru the case 85A, or substituted for said bolt I may employ a manually operated pawl or a clutch band or clutch shoe or the like.

In the operation and use of my improved device the driving shaft 1 is gradually clutched to the motor and then rotates at crankshaft speed driving the gear 17 transmitting power thru the reduction gears 16, 15 and 14 to the driven shaft 2. For example we may consider the device as employed operating in an automobile. In starting the car from rest at first the resistance torque in the driven shaft 2 is great and the lesser driving torque in the shaft 1 is transmitted thru the reduction gears and moves the car slowly forward. The great resistance torque tends to rotate the drum 18 in a retrograde direction relative to the rotation of the shafts 1 and 2; but, the drum 18 is prevented from reversing because of the pawls 703 locked with the teeth 705 encircled in the case 85A. Each rotation of the driving shaft 1 gained over the driven shaft 2 completes a cycle of reciprocative movement of the centrifugal weights 77B which are directly and positively operated by means of the diametrically opposed eccentrics 1E and 1F integral with the shaft 1. While the car is moving slowly the work of reciprocating the weights 77B has a slight braking effect upon the motor; however, inasmuch as this braking effect is transmitted directly from the driven shaft 2 to the driving shaft 1 there is always a direct impelling force proportionate to the work of reciprocating or moving the weights 77B against centrifugal resistance. Centrifugal force drawing the weights 77B is proportionate to the speed of the vehicle, and as the car gains speed there is greater direct impelling force which relieves the gears of part of their work and the drum 18 begins rotating from impetus created by journal friction of the countershafts 24 effecting a succession of intermediate speeds until the speed is reached when it is impossible to reciprocate the weights 77B against the terrific centrifugal force and the car is in high gear with the whole assembly rotating at crankshaft speed.

It is to be noted that the speed necessary to maintain the vehicle in high gear depends upon the resistance torque as well as the speed of the vehicle. The device may function in high gear while driving a car at five miles per hour on a level pavement, whereas a speed of ten miles per hour may be necessary to maintain high gear in deep sand. However it is clear that the vehicle will, under all conditions of road or load, be driven at a speed which utilizes the motor power in a highly efficient manner.

When the drum 18 rotates centrifugal force causes the weighted long ends of the pawl-levers 703 to be thrown outward drawing the short ends 703E inward so that they do not contact with the teeth 705. When there is no centrifugal force at the moment the drum 18 stops and before it can reverse each pawl 703 is certain to engage a tooth 705 to prevent reversing the drum.

If I employ the constructions shown in Figs. 8 and 19 when starting a vehicle from rest the operation begins with the drum automatically locked to the case 85A and the gear 14 starts slowly rotating relative thereto causing the weights 77B to reciprocate under low centrifugal resistance. Ordinarily the drum 18 is thusly locked to the case 85A but for a few moments after which the drum 18 begins rotating principally because its cam shaped hub does the work of moving the weights 77B against centrifugal resistance. The resistance torque permitting, the drum 18 rotates faster relative to the gear 14 as the centrifugal force increases and a succession of intermediate gear ratios is effected until the whole planetary assembly rotates as a unit at motor crankshaft speed.

When the pawl-levers 703 and the teeth 705 are made entirely of metal there will sometimes be produced a slight, metallic, clicking sound when the drum 18 rotates so slowly that the centrifugal force is inadequate to carry the pawl-levers free and clear of the teeth 705. To prevent this metallic noise I attach to the pawls a facing 703F of some suitable non-metallic material such as hard felt, vulcanite, or composition dovetailed in or secured in any ordinary manner.

When a reversing mechanism is employed located at the forward end of the shaft 1 I suggest locking the drum 18 by means of the manually operated bolt 18B, whereas added reduction in the reversing gears will easily move the vehicle while the weights are reciprocated under low centrifugal force.

It will be noted that the arrangement of the pawls 703 is such that the vehicle is easily towed forward; however, to easily tow the car backward it is necessary only to pry the key 2E backward out of engagement with the worm 2H; or, in lieu of this special arrangement the construction shown in Fig. 6 may be employed to move the teeth 705 out of operative engagement with the pawls.

When the elements of my device are formed and arranged as shown in Fig. 9 of the drawings it will be obvious that the operation is substantially the same as hereinbefore described; and in view of this it will be noted that a spiral gear 17 fixed to the driving shaft 1 is in mesh with and drives a spiral planet-gear 16 mounted on a countershaft 24 journaled for rotation in the drum 18, and it will be noted that but one of these planet-gears is necessary, however it is preferable to have a pair of them, as shown, and the spiral planet-gears 16 mesh with the internal spiral gear 14 to transmit power to rotate the gear 14 in the same direction as the gear 17. The driven shaft 2 is formed enlarged at its forward end and secured to the gear 14 in a manner as shown, or in any common or usual way, to carry the centrifugal weights 77B reciprocatively mounted and disposed to rotate with the shaft 2 and at the same speed of rotation as the gear 14 in revolutions per minute. The weights 77B are in ball bearing contact with the eccentrics 1E and 1F fixed to the driving shaft 1. Inasmuch as the shaft 1 is journaled for rotation relative to the driven shaft 2 as hereinbefore stated the weights 77B are reciprocated when the shaft 1 gains a rotation over the shaft 2, and the force required to accomplish the movement of said weights against centrifugal resistance varies with the speed of rotation of the gear 14 and shaft 2. It will be obvious that the size of the centrifugal weight 77B may be lessened by relatively increasing the diameters of the countershafts 24 and the bearings in which they are journaled, by reason of the fact that such resistance against rotating the shafts 24 in the drum 18 produces a more direct driving effect impelling the drum to rotate as is the function of the weights 77B. Hence, I may desire to employ such most suitable balance or relation, which is obvious, further, by reason of the facts that for each countershaft in the case of the larger diameter each point of frictional resistance is relatively farther from its gear fulcrum which is the center or axis of the respective shaft 24, said friction point moves faster in a given number of revolutions per minute, and there are more points of frictional resistance. On the drum 18 teeth are formed in annular series disposed to be engaged by a pawl 703 suitably hinged in the case 85A. Fixed to the pawl 703 may project a resilient finger in frictional contact with the front face of the drum 18 and disposed so that a slight forward relative rotary movement of the drum 18 will swing said finger and disengage the pawl 703 from any contact with the teeth formed on the drum 18, and a slight retrograde rotation of the drum will move the pawl 703 into locked relation with said teeth. A thumb-screw R3 is carried threaded thru the case 85A and of a disposition to be manually turned thru the case against a suitable surface of the pawl 703 to unlock said pawl from engagement with the teeth formed on the drum 18 and to hold said pawl in such disengaged position.

The planet-gear 16 may have its rim on one side disposed radially from its axis formed thicker and heavier than on the side diametrically opposite to provide a centrifugally operating mass in eccentric unbalance relative to the axis of said planet-gear. This feature alone incorporated in the gear assembly provides a centrifugally operating governor to control the speed of revolution of the planet-gear, and is especially useful in lieu of the centrifugal clutch hereinbefore described as employed to gradually vary the ratio of speed transmission by effecting variable rotation in the drum. And in operation when I employ this unbalanced planet-gear as a centrifugally operating means to control the speed of revolution of the planet-gear the entire rotating assembly is employed as a motor flywheel and the friction or centrifugal clutch used to pick up the load is installed between my device and the load, and it will be clear that when the assembly is rotating as a flywheel the centrifugal action on the pair of unbalanced planet-gears will tend to hold the heavier sides farthest radially outward with respect to the axis of the drum, then if I engage the clutch the heavy initial resistance torque will cause the planet-gears to begin rotating and to slacken in speed of revolution and the kinetic energy in the drum affords support to the gear fulcrum. Furthermore this unbalanced planet-gear feature may well be used in conjunction with the centrifugal clutch hereinbefore described. And in this combination I may employ the arrangement of elements as shown in Figs. 19 and 20, in which the duplex cam is elliptical in form and is fixed to the drum 18. Each weight is pivoted in a fixed element of the driven shaft 2 and in a similar manner as shown in Fig. 7 of the drawings. When the driven shaft 2 is rotated by means of the set of gears of which the gear 14 is fixed to the driven shaft 2 the weights 77B are revolved about the axis of said shaft and move relative to the drum 18 and its elliptical cam until centrifugal force exerts sufficient resistance against the movement of the weights to bring the drum 18 into rotation equal to the speed of rotation of the driven shaft 2. It will be obvious that the work of oscillating the weights 77B even before active centrifugal force is generated offers to impel the drum 18 to rotate, so that it is clear that if I wish to employ the friction clutch between my device and the motor I may employ any one or all of the means to control the speed of revolution of the planet-gears, such means including countershaft journal friction, unbalanced planet-gears, (or this unbalanced mass carried eccentrically relative to the axis of the countershaft 24 and specifically mentioned as being integral with the planet-gear may be any such mass thusly carried anywhere in fixed connection with the countershaft) and centrifugal weights moved against centrifugal resistance by means of a cam or other means of which others are herein described.

Another means to move weights against centrifugal resistance is shown in Fig. 17 of the drawings, in which a set of gears is employed with a gear 1EG fixed to the driving shaft 1 and each other gear 1FG is fixed to its corresponding weight 77B, the gear 1EG being in mesh with each gear 1FG to revolve each weight about a pivot which is the axis of its corresponding gear. Thru one half of a revolution each weight is revolved against centrifugal resistance when the weights are also being revolved about the axis of the shaft 2. Each weight is journaled in the enlarged front end of the driven shaft 2 and thus makes operative connection with the driving shaft 1.

In lieu of the spiral gears shown in Fig. 9 I may arrange and form the elements to employ the planetary assembly shown in Fig. 13 in which the driven gear 14 is an internal spur gear; or I may employ bevel gears as shown in Fig. 15.

As illustrated in Fig. 19 I may wish to use a spring 77S for the purpose of constantly bearing each weight 77B into operative relation with the cam employed to move the weight against centrifugal resistance, and this is especially desirable to insure that relation of weight and cam when the centrifugal force acting upon the weight is not operatively effective.

I do not wish to confine myself to the carrying of the weights particularly on the ensemble on and including the driven shaft for as shown in Figs. 21 and 22 it will be clear that I may have an operating device with the centrifugal weights carried by the ensemble on and including the driving shaft with means to reciprocate or move against centrifugal resistance said weights; and referring to Fig. 21 it will be noted that when the construction shown in Fig. 9 is modified so that the elements are formed and arranged as in Fig. 21 I carry a cam in fixed connection with the driven shaft 2 to move the weights 77B against centrifugal resistance, and that the weights are pivoted in the drum 18 on respective shafts S2. The elliptical, duplex cam, the gear 14 and the shaft 2 are shown integrally formed; however, these may be formed separately and secured together in any ordinary manner. The rollers R1 and R2 mounted on the rear, studded ends of the weights 77B may be freely carried on roller or ball bearings to approach minimum friction while traveling the elliptical race or cam under high centrifugal pressure. The smaller rollers R2 have a slight clearance from any contact with their periphery when the weights 77B are actuated under operative centrifugal pressure but may come in contact with the elliptical hub 2C to limit the movements of the weights 77B when there is no centrifugal pressure. This arrangement of elements is especially desirable when the rotating assembly is employed as a motor flywheel and the friction clutch is employed engaged between the device and the load as hereinbefore mentioned, the pawls 703 may be omitted from the construction and other factors hereinbefore mentioned relied upon to govern the speed of revolution of the planet-gears. However, if I attach a friction clutch to be employed to gradually connect the motor to the device I may employ the pawls 703 to prevent retrograde movement of the drum 18, then in operation when the drum is at rest and the shaft 2 is rotating the weights 77B are being oscillated giving impulse to the drum until it in turn rotates and generates centrifugal pressure to gradually lock the drum to the driven shaft 2. It will be obvious that if I omit the pawl 703 from the construction and clutch the motor to the shaft 1 the resistance torque in the shaft 2 may be of a magnitude such as to cause retrograde movement of the drum 18, however, rotation of the drum generates centrifugal pressure in the weights to check the movement of the drum and produce a tendency to rotate in the direction of the driving shaft 1, and under certain conditions of torque this arrangement may function as a perfect working device.

A centrifugal clutch such as I have illustrated and described in my application for Letters Patent filed Feb. 2, 1927, and having Serial No. 165,407, may be employed to advantage for use in gradually connecting the power to the load, and this type of clutch is especially desirable when my device is employed as a motor flywheel and the clutch for picking up the load is installed between the shaft 2 and a more remote load-carrying element. Such a centrifugal clutch may be modified to employ a form of cam and arrangement of centrifugal weights substantially the same as shown in Fig. 21 of the drawings annexed to this specification, however the elliptical race of the cam will vary so that the major and minor axes of the ellipse will gradually become more nearly equal until the race will be annular thru a section nearest the element 18 which carries the centrifugal weights as is particularly illustrated in Figs. 23, 24, and 25, and when employing a flange and yoke or other ordinary means to move the cam radially away from or toward the element 18 and the gears omitted from the construction and having the element 18 fixed to the shaft 1 which is piloted into the shaft 2 it will be obvious that I then have a working centrifugal clutch to gradually pick up and carry the load, and in this construction the shaft 1 will be the shaft 2 of my power-control device.

While in certain mechanisms of my device I have shown elements formed and arranged in pairs it will be understood that I do not wish to confine myself to the use of a plurality of these elements thusly arranged: however it is preferable to employ a pair of the centrifugal weights to maintain a perfect balance, yet it will be obvious that the construction shown in Fig. 9 is workable with one planet-gear 16.

While I have illustrated and described fair working examples of my improvements I do not wish to be understood as limiting myself to the specific details of construction and formation of the elements shown, as under the spirit of my invention I believe that I am entitled to employ a wide variation of detail such as may fall within the scope of the appended claims.

Having thus described my invention, what I claim as new and desire to secure by Letters Patent, is:—

1. In a device of the class described, the combination of a driving shaft, a load-carrying driven shaft, a planetary differential gear-assembly positively connecting the driving shaft to said driven shaft, planet-gear revolution control means, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission.

2. In a device of the class described, the combination of a driving shaft, a load-carrying driven shaft, a planetary differential gear-assembly positively connecting the driving shaft to the driven shaft, said gear-assembly including a gear-carrying element mounted on one of the shafts for relative rotation to said shafts, a spiral gear concentrically connected to the driving shaft, a spiral gear concentrically connected to the driven shaft, a spiral planet-gear journaled for rotation in said gear-carrying element and in mesh with the aforesaid gears, means to control the revolution of the planet-gear, and automatically actuating clutch means operatively connecting the driving and driven shafts whereby to vary gradually the ratio of speed transmission.

3. In a device of the class described, the combination of a driving shaft, a load-carrying driven shaft, a gear-assembly operatively connecting the driving and driven shafts, said gear-assembly including a gear-carrying element loosely mounted on one of the shafts for relative rotation to the shafts, one of the gears concentrically connected to the driving shaft and another concentrically connected to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, a case, said ensembles journaled for rotation in the case, lock means acting between said gear-carrying element and the case to prevent rotation of the gear-carrying element, and means to lock and unlock said lock means.

4. In a device of the class described, the combination of a driving shaft, a load-carrying driven shaft, a gear-assembly operatively connecting the driving and driven shafts, said gear-assembly including a gear-carrying element loosely mounted on one of the shafts for relative rotation to said shafts, one of the gears concentrically connected to the driving shaft and another concentrically connected to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, a case, said ensembles journaled for rotation in the case, automatically actuated lock means to prevent rotation of the gear-carrying element, said lock means comprising a pawl pivoted in the case to engage a series of teeth formed on the gear-carrying element and a finger fixed to the pawl and projecting into frictional contact with the gear-carrying element to carry said pawl into engagement with said series of teeth when the gear-carrying element rotates in one direction and to carry the pawl out of engagement with the series of teeth when the gear-carrying element rotates in the other direction.

5. In a device of the class described, the combination of a driving shaft, a load-carrying driven shaft, a gear-assembly operatively connecting the driving and driven shafts, said gear-assembly including a gear-carrying element loosely mounted on one of said shafts for relative rotation to the shafts, one of the gears concentrically connected to the driving shaft and another concentrically connected to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, a case, said ensembles journaled for rotation in the case, automatically actuated lock means acting between said gear-carrying element and the case to prevent rotation of the gear-carrying element, and means to render inoperative said lock means.

6. In a device of the class described, the combination of a driving shaft, a load-carrying driven shaft, a gear-assembly operatively connecting the driving and driven shafts, said gear-assembly including a gear-carrying element loosely mounted on one of the shafts for relative rotation to said shafts, one of the gears concentrically connected to the driving shaft and another concentrically connected to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, a case, said ensembles journaled for rotation in the case, automatically actuated lock means to prevent rotation of the gear-carrying element, said lock means comprising a pawl pivoted in the case to engage a series of teeth formed on the gear-carrying element and a finger fixed to the pawl and projecting into frictional contact with the gear-carrying element to carry said pawl into engagement with said series of teeth when the gear-carrying element rotates in one direction and to carry the pawl out of engagement with the series of teeth when the gear-carrying element rotates in the other direction, and means to render inoperative said lock means including a manually operated screw turned thru the case to bear against a suitable portion of the pawl.

7. In a device of the class described, the combination of a driving shaft, a load-carrying driven shaft, a gear-assembly operatively connecting the driving and driven shafts, said gear-assembly including a gear-carrying element loosely mounted on one of the shafts for relative rotation to said shafts, one of the gears concentrically connected to the driving shaft and another concentrically connected to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, a case, said ensembles journaled for rotation in the case, automatically actuated lock means acting between said gear-carrying element and the case to prevent rotation of the gear-carrying element, and manually operated lock means acting between the case and the gear-carrying element.

8. In a device of the class described, the combination of a driving shaft, a load-carrying driven shaft, a planetary differential gear-assembly positively connecting the driving shaft to said driven shaft, an unbalanced planet-gear having a centrifugal mass eccentrically located with respect to the axis of said gear to govern the speed of rotation of the planet-gear, means to govern the speed of revolution of said gear including a centrifugally operating weight free to be moved against centrifugal resistance and in positive connection with the ensemble on and including the driven shaft and means in positive connection with the ensemble on and including the driving shaft to move said weight against centrifugal resistance whereby to vary gradually the ratio of speed transmission, said first mentioned ensemble comprising the load-carrying driven shaft and the gear secured thereon, and the last named ensemble comprising the driving shaft, the planet-gear and the carrier in which said planet-gear is journaled for rotation as well as carried for revolution about the driving shaft, and the gear in driving connection with the driving shaft and the planet-gear.

9. In a device of the class described, the combination of a driving shaft, a load-carrying driven shaft, a planetary differential gear-assembly positively connecting the driving shaft to said driven shaft, an unbalanced planet-gear having a centrifugal mass eccentrically located with respect to the axis of said gear to control the speed or rotation of the planet gear whereby to vary gradually the ratio of speed transmission, and frictionally actuated means acting automatically to prevent retrograde revolution of the planet gear.

10. In a device of the class described, the combination of a driving shaft, a load-carrying driven shaft, a planetary differential gear-assembly positively connecting the driving shaft to said driven shaft, means to control automatically the revolution of the planet-gear, a countershaft carrying the planet-gear and having a suitable portion of its length journaled for rotation in bearings having a diameter proportionate to the diameter of said planet-gear to afford sufficient resistance to rotation to cause said planet-gear to revolve when the resistance torque in the driven shaft is light and to rotate when the resistance torque in the driven shaft is heavy, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission.

11. In a device of the class described, the combination of a driving shaft, a load-carrying driven shaft, a planetary differential gear-assembly positively connecting the driving shaft to the driven shaft, an unbalanced planet-gear having a centrifugal mass eccentrically located with respect to its axis to control the speed of rotation of the planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, and automatically actuating means to prevent retrograde revolution of the planet gear.

12. In a device of the class described, the combination of a driving shaft, a load-carrying driven shaft, a planetary differential gear-assembly positively connecting the driving shaft to the driven shaft, an unbalanced planet-gear having a centrifugal mass eccentrically located with respect to its axis to control the speed of rotation of said planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, automatically actuating means to prevent retrograde revolution of the planet-gear, and manually operated means to prevent retrograde revolution of said planet-gear.

13. In a device of the class described, the combination of a driving shaft, a load-carrying driven shaft, a planetary differential gear-assembly positively connecting the driving shaft to the driven shaft, an unbalanced planet-gear having a centrifugal mass eccentrically located with respect to its axis to control the speed of rotation of said planet gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, automatically actuating means to prevent retrograde revolution of the planet-gear, and means to render inoperative said last named means.

14. In a device of the class described, the combination of a driving shaft, a load-carrying driven shaft, a planetary differential gear-assembly positively connecting the driving shaft to the driven shaft, an unbalanced planet-gear having a centrifugal mass eccentrically located with respect to its axis to control the speed of rotation of said planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, and means to prevent retrograde revolution of the planet-gear, said last named means comprising a series of teeth annularly formed on the carrier of said planet-gear and concentric with the driving shaft, a case in which said carrier is journaled for rotation, a pawl pivoted in the case to engage with said series of teeth and a finger fixed to the pawl and projecting into frictional contact with said carrier to swing said pawl into engagement with said series of teeth when the carrier begins rotating in a retrograde direction.

15. In a device of the class described, the combination of a driving shaft, a load-carrying driven shaft, a planetary differential gear-assembly positively connecting the driving shaft to the driven shaft, an unbalanced planet gear having a centrifugal mass eccentrically located with respect to its axis to control the speed of rotation of said planet gear, a countershaft carrying the planet-gear and having a suitable portion of its length journaled for rotation in bearings having a diameter proportionate to the diameter of said planet-gear to afford sufficient resistance to rotation to cause said planet-gear to revolve when the resistance torque in the driven shaft is light and to rotate when the resistance torque in the driven shaft is heavy, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission.

16. In a device of the class described, the combination of a driving shaft, a load-carrying driven shaft, a planetary differential gear-assembly positively connecting the driving shaft to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a cam in positive connection with the other ensemble to move said weight against centrifugal resistance whereby to vary gradually the ratio of speed transmission, and means to prevent retrograde revolution of the planet-gear.

17. In a device of the class described, the combination of a driving shaft, a load-carrying driven shaft, a planetary differential gear-assembly positively connecting the driving shaft to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a cam in positive connection with the other ensemble to move said weight against centrifugal resistance whereby to vary gradually the ratio of speed transmission, automatically actuating means to prevent retrograde revolution of the planet-gear, and means to render inoperative said last named means.

18. In a device of the class described, the combination of a driving shaft, a load-carrying driven shaft, a planetary differential gear-assembly positively connecting the driving shaft to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a cam in positive connection with the other ensemble to move said weight against centrifugal resistance whereby to vary gradually the ratio of sped transmission, and means to prevent retrograde revolution of the planet-gear, said last named means comprising a series of teeth annularly formed on the carrier of said planet-gear and concentric with the driving shaft, a case in which the carrier is journaled for rotation, a pawl pivoted in the case to engage with said series of teeth and a finger fixed to the pawl and projecting into frictional contact with said carrier to swing said pawl into engagement with said series of teeth when the planet-gear begins to revolve in a retrograde direction.

19. In a device of the class described, the combination of a driving shaft, a load-carrying driven shaft, a differential planetary gear-assembly positively connecting the driving shaft to the driven shaft, said gear-assembly including a gear carrier mounted on one of the shafts for relative rotation to the shafts, a spiral gear concentrically connected to the driven shaft, a spiral gear concentrically connected to the driving shaft, a spiral planet-gear journaled for rotation in said gear carrier and in mesh with the aforesaid gears, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, and means to prevent retrograde revolution of the planet-gear.

20. In a device of the class described, the combination of a driving shaft, a load-carrying driven shaft, a gear-assembly positively connecting the driving shaft to the driven shaft, said gear-assembly including a gear carrier mounted on one of the shafts for relative rotation to said shafts, a spiral gear concentrically connected to the driving shaft, a spiral gear concentrically connected to the driven shaft, a spiral planet-gear journaled for rotation in said gear carrier and in mesh with the aforesaid gears, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, automatically actuating means to prevent retrograde revolution of the planet-gear, and means to render inoperative said last named means.

21. In a device of the class described, the combination of a driving shaft, a load-carrying driven shaft, a gear-assembly positively connecting the driving shaft to the driven shaft, said gear-assembly including a gear carrier mounted on one of the shafts for relative rotation to said shafts, a spiral gear concentrically connected to the driving shaft, a spiral gear concentrically connected to the driven shaft, a spiral planet-gear journaled for rotation in said gear carrier and in mesh with the aforesaid gears, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of sped transmission, automatically actuating means to prevent retrograde revolution of said planet-gear, and manually operated means to prevent retrograde revolution of said planet-gear.

22. In a device of the class described, the combination of a driving shaft, a load-carrying driven shaft, a gear-assembly positively connecting the driving shaft to the driven shaft, said gear-assembly including a gear carrier mounted on one of the shafts for relative rotation to said shafts, a spiral gear concentrically connected to the driving shaft, a spiral gear concentrically connected to the driven shaft, a spiral planet-gear journaled for rotation in said gear carrier and in mesh with the aforesaid gears, clutch means operatively connecting the ensemble on and including the driving shaft to the ensemble on and including the driven shaft, the former ensemble comprising the driving shaft, the planet-gear and the carrier in which said planet-gear is journaled for rotaton as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, and means to prevent retrograde revolution of the planet-gear, said last named means comprising a series of teeth annularly formed on the carrier of said planet-gear and concentric with the driving shaft, a case in which said carrier is journaled for rotation, a pawl pivoted in the case to engage with said series of teeth and a finger fixed to the pawl and projecting into frictional contact with said carrier to swing said pawl into engagement with said series of teeth when the carrier begins retrograde rotation.

23. In a device of the class described, the combination of a driving shaft, a load-carrying driven shaft, a gear-assembly positively connecting the driving shaft to the driven shaft, said gear-assembly including a gear carrier mounted on one of the shafts for relative rotation to said shafts, a spiral gear concentrically connected to the driving shaft, a spiral gear concentrically connected to the driven shaft, a spiral planet-gear journaled for rotation in said gear carrier and in mesh with the aforesaid gears, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a cam in positive connection with the other ensemble to move said weight against centrifugal resistance whereby to vary gradually the ratio of speed transmission, and means to prevent retrograde revolution of the planet-gear.

24. In a device of the class described residing in a variable torque, motor flywheel and clutch, the combination of a driving shaft, a load-carrying driven shaft, a planetary differential gear-assembly positively connecting the driving shaft to the driven shaft, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and means in positive connection with the other ensemble to move said weight against centrifugal resistance whereby to vary gradually the ratio of speed transmission, said combination formed to be employed as a motor flywheel, and clutch means to gradually connect the aforesaid load-carrying shaft to a more remote load-carrying element.

25. In a device of the class described, the combination of a driving shaft, a load-carrying driven shaft, a planetary differential gear-assembly operatively connecting the driving shaft to the driven shaft, means to control the revolution of the planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with the ensemble on and including the driven shaft, and a cam fixed to the planet-gear carrier to move said weight against centrifugal resistance whereby to vary gradually the ratio of speed transmission.

26. In a device of the class described, the combination of a driving shaft, a load-carrying driven shaft, a planetary differential gear-assembly operatively connecting the driving shaft to the driven shaft, means to control the revolution of the planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a cam in positive connection with the other ensemble to move said weight against centrifugal resistance whereby to vary gradually the ratio of speed transmission, and a roller rotatively carried on a suitable shaft-like portion of the weight and operating in rolling contact with the cam.

27. In a device of the class described, the combination of a driving shaft, a load-carrying driven shaft, a planetary differential gear-assembly operatively connecting the driving shaft to the driven shaft, means to control the revolution of the planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a duplex cam in positive connection with the other ensemble to move said weight against centrifugal resistance whereby to vary gradually the ratio of speed transmission, said cam having an internal race and an external race between which operates a roller which is rotatively carried on a suitable shaft-like portion of the weight to have rolling contact with one of the cam races.

28. In a device of the class described, the combination of a driving shaft, a load-carrying driven shaft, a planetary differential gear-assembly operatively connecting the driving shaft to the driven shaft, means to control the revolution of the planet-gear, clutch means operatively connecting the ensemble on and including the driving shaft to the ensemble on and including the driven shaft, the former ensemble comprising the driving shaft, the planet-gear and the carrier in which said planet-gear is journaled for rotation as well as carried for revolution about the driving shaft, and the gear in driving connection with the driving shaft and the planet-gear, the latter ensemble comprising the load-carrying driven shaft and the gear secured thereon, said clutch means including a centrifugally operating weight free to be moved against centrifugal resistance and in positive connection with one of said ensembles and a duplex cam in positive connection with the other ensemble to move said weight against centrifugal resistance whereby to vary gradually the ratio of speed transmission, said cam having an internal race and an external race between which operates a pair of rollers rotatively carried on a suitable shaft-like portion of the centrifugal weight so that one roller of said pair may have rolling contact with the internal race and the other roller of said pair have rolling contact with the external race.

Signed at Lansing, in the county of Ingham and State of Michigan, this 16th day of November, 1927.

GAIL H. HINES.